United States Patent
Couelier

(10) Patent No.: US 10,248,635 B2
(45) Date of Patent: Apr. 2, 2019

(54) METHOD FOR INSERTING CHARACTERS IN A CHARACTER STRING AND THE CORRESPONDING DIGITAL SERVICE

(71) Applicant: MYSCRIPT, Nantes (FR)

(72) Inventor: Joel Couelier, Nantes (FR)

(73) Assignee: MYSCRIPT, Nantes (FR)

( * ) Notice: Subject to any disclaimer, the term of this patent is extended or adjusted under 35 U.S.C. 154(b) by 193 days.

(21) Appl. No.: 15/217,697

(22) Filed: Jul. 22, 2016

(65) Prior Publication Data
US 2017/0249293 A1    Aug. 31, 2017

(30) Foreign Application Priority Data

Feb. 29, 2016  (EP) ...................................... 16305229
May 11, 2016  (EP) ...................................... 16305550

(51) Int. Cl.
*G06F 17/22* (2006.01)
*G06F 17/24* (2006.01)
(Continued)

(52) U.S. Cl.
CPC ............ *G06F 17/24* (2013.01); *G06F 3/0485* (2013.01); *G06F 3/04842* (2013.01);
(Continued)

(58) Field of Classification Search
CPC ............... G06F 3/04842; G06F 3/0485; G06F 3/04883; G06F 17/24; G06F 17/242;
(Continued)

(56) References Cited

U.S. PATENT DOCUMENTS 5,838,302 A    11/1998  Kuriyama et al.
6,088,481 A *   7/2000  Okamoto .............. G06F 3/0488
                                                        345/179
(Continued)

FOREIGN PATENT DOCUMENTS

EP      2 088 536 A1     8/2009
WO    2014/174219 A1    10/2014

OTHER PUBLICATIONS

Joel Couelier et al., "Method and System for Character Insertion in a Character String", U.S. Appl. No. 15/192,252, filed Jun. 24, 2016, pp. 1-34.
(Continued)

*Primary Examiner* — Maikhanh Nguyen
(74) *Attorney, Agent, or Firm* — MH2 Technology Law Group, LLP

(57) ABSTRACT

The disclosure relates to a character input method and system, which may include a digital device including an input surface and an output surface. The method and system may include or perform operations including: displaying a character string using a recognition area and an insertion area of the output surface; selecting a position within the character string; displaying, in the recognition area, a part of the string ending with a first character while masking, in the insertion area, a part of the string starting with a second, succeeding character; detecting an input stroke entered manually in the insertion area; performing handwriting recognition; inserting, at the position within the string of characters, a recognised character(s); and scrolling the string in the recognition area so as to display, in the recognition area, the recognised character(s) that were inserted into the string of characters.

20 Claims, 5 Drawing Sheets

(51) Int. Cl.
*G06F 3/0484* (2013.01)
*G06F 3/0485* (2013.01)
*G06F 3/0488* (2013.01)
*G06K 9/00* (2006.01)

(52) U.S. Cl.
CPC ........ *G06F 3/04883* (2013.01); *G06F 17/242* (2013.01); *G06K 9/00402* (2013.01); *G06K 9/00416* (2013.01); *G06F 2203/04808* (2013.01)

(58) Field of Classification Search
CPC ...... G06F 2203/04808; G06K 9/00416; G06K 9/00402
See application file for complete search history.

(56) References Cited

U.S. PATENT DOCUMENTS

| | | | |
|---|---|---|---|
| 6,256,009 B1* | 7/2001 | Lui | G06F 3/0485 178/18.03 |
| 6,341,176 B1* | 1/2002 | Shirasaki | G06K 9/72 382/229 |
| 6,408,092 B1* | 6/2002 | Sites | G06K 9/222 345/158 |
| 6,507,678 B2* | 1/2003 | Yahagi | G06F 3/018 358/403 |
| 6,577,296 B2 | 6/2003 | Flack | |
| 6,661,409 B2 | 12/2003 | Demartines et al. | |
| 7,013,046 B2* | 3/2006 | Kawamura | G06K 9/222 345/179 |
| 7,158,678 B2* | 1/2007 | Nagel | G06K 9/222 345/173 |
| 7,174,042 B1* | 2/2007 | Simmons | G06K 9/00402 345/169 |
| 7,251,367 B2* | 7/2007 | Zhai | G06K 9/222 382/229 |
| 7,380,203 B2* | 5/2008 | Keely | G06K 9/222 704/235 |
| 7,567,239 B2 | 7/2009 | Seni | |
| 7,571,384 B1 | 8/2009 | Webb | |
| 7,885,464 B2* | 2/2011 | Kawamura | G06K 9/222 382/186 |
| 8,116,569 B2 | 2/2012 | Markiewicz et al. | |
| 8,276,101 B2 | 9/2012 | Li | |
| 8,363,949 B2* | 1/2013 | Rowley | G06F 3/04883 345/179 |
| 2002/0071607 A1* | 6/2002 | Kawamura | G06K 9/222 382/187 |
| 2003/0038788 A1* | 2/2003 | Demartines | G06F 3/0485 345/173 |
| 2006/0088216 A1* | 4/2006 | Kawamura | G06K 9/222 382/187 |
| 2009/0087095 A1* | 4/2009 | Webb | G06F 3/04883 382/189 |
| 2009/0161958 A1 | 6/2009 | Markiewicz et al. | |
| 2011/0320978 A1* | 12/2011 | Horodezky | G06F 3/0488 345/173 |
| 2012/0032877 A1 | 2/2012 | Watkins, Jr. et al. | |
| 2012/0117506 A1 | 5/2012 | Koch et al. | |
| 2012/0293424 A1 | 11/2012 | Dai et al. | |
| 2013/0006639 A1 | 1/2013 | Kristensson et al. | |
| 2013/0120305 A1* | 5/2013 | Yasui | G06F 3/0237 345/173 |
| 2014/0040733 A1* | 2/2014 | Colley | G06F 3/0237 715/256 |
| 2015/0193141 A1 | 7/2015 | Goldsmith et al. | |
| 2015/0212731 A1* | 7/2015 | Karafiat | G06F 3/04886 715/773 |
| 2016/0070462 A1 | 3/2016 | Baudry et al. | |
| 2017/0249505 A1 | 8/2017 | Couelier et al. | |

OTHER PUBLICATIONS

International Search Report and Written Opinion of the International Searching Authority dated May 8, 2017, International Application No. PCT/EP2017/054404, pp. 1-16.
International Search Report and Written Opinion of the International Searching Authority dated May 8, 2017, International Application No. PCT/EP2017/054401, pp. 1-15.
Non-Final Office Action dated Sep. 21, 2017, U.S. Appl. No. 15/192,252, pp. 1-35.
International Search Report dated Jun. 23, 2014 issued in International Application No. PCT/FR2014/050991 filed Apr. 24, 2014, pp. 1-7.
Shilman, Michael et al. CueTIP: A Mixed-Initiative Interface for Correcting Handwriting Errors. Proceedings for the 19th Annual ACM Symposium on User Interface Software and Technology, Jan. 1, 2006, pp. 323-332.
Final Office Action dated May 17, 2018 in U.S. Appl. No. 15/192,252, 18 pages.
Office Action dated Dec. 13, 2017 in U.S. Appl. No. 14/786,819, 34 pages.
Final Office Action dated Sep. 7, 2018 in U.S. Appl. No. 14/786,819, 34 pages.
Office Action dated Sep. 28, 2018 in U.S. Appl. No. 15/192,252, 12 pages.

* cited by examiner

METHOD FOR INSERTING CHARACTERS IN A CHARACTER STRING AND THE CORRESPONDING DIGITAL SERVICE

CROSS REFERENCE TO RELATED APPLICATIONS

This application claims the priority of European Patent Application No. 16 305 550.2 filed on 11 May 2016, and claims the priority of European Patent Application No. 16 305 229.3 filed on 29 Feb. 2016, the entire disclosures of which are hereby incorporated by reference in their entireties.

TECHNICAL FIELD

The present disclosure relates generally to the field of electronic devices capable of recognizing user input handwriting of various characters, and concerns more particularly a system and corresponding method for inserting one or several characters into a string of characters.

BACKGROUND

Computing devices continue to become more ubiquitous to daily life. They may take various forms such as desktop computers, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances. Each type of computing device is equipped with particular computing resources and designed for particular uses. The variety of computing devices and their subsequent uses necessitate a variety of input devices to allow users to interact with their computing devices.

One such input device is a touch sensitive surface such as a touchscreen or touchpad wherein the user input is received through contact between a user body part (e.g. a finger) or a user-held instrument (e.g. a pen or stylus), and the touch sensitive surface. Another input device is an input surface that senses gestures or motions made by a user above the input surface. A further input device is a position detection system which detects the relative position of either touch or non-touch interactions with a non-touch physical or virtual surface. Any of these methods can be used generally for hand-drawing or for handwriting, such as for inputting text content, such as alphabetic, numeric, grammatical and symbol characters. When user input is drawn or written, the user's handwriting is typically interpreted using a real-time handwriting recognition system or method. To this end, either on-line systems (e.g., recognition carried out using a cloud-based solution or the like) or off-line systems may be used.

Generally, handwriting recognition systems or methods monitor the initiation of a stroke, such as when the user contacts a touch sensitive surface (e.g., pen-down); the termination of a stroke, such that when the user stops contacting a touch sensitive surface (e.g., pen-up); and any stroke or line that the user makes with his or her finger or instrument between the initiation and termination of a stroke.

The type of computing device can determine the user input interface or method used for inputting characters. As computing devices become smaller, different input interfaces and methods have been developed to allow users to input content in an intuitive and easy manner.

In computing devices where the user draws the input characters, managing the insertion of characters into existing text or the like constitutes a difficult challenge as it generally requires particular gestures with the user's finger or instrument. Conventional text insertion techniques are generally not user-friendly as they require complex or non-intuitive interactions by the user with the interface surface. Too often, the user does not understand, or remember, the insertion technique (if any) implemented by a particular computing device. Some conventional techniques require the user to insert content for editing existing content into a dedicated editing field which is separate from the usual input field, thereby reducing the ergonomics of the input interface and application to devices having smaller interfaces.

Additionally, there is not always sufficient space on the interface surface to display the existing characters into which the user wishes to perform content insertion, thereby rendering difficult the process of selecting the position where content is to be inserted.

A more efficient and user-friendly input method and system is therefore needed to allow insertion of content with respect to existing content when using computing devices such as those mentioned above.

SUMMARY

According to a particular aspect, the present disclosure relates to a character input method performed by a digital device comprising an input surface for inputting characters and an output surface for displaying characters, the output surface comprising a recognition area and an insertion area, the method comprising:
- a first displaying for displaying a string of characters using the recognition area and the insertion area as a display region for the first displaying;
- in response to an interaction of a user with the input surface, selecting a position within the string of characters between a first character and a second character displayed on the output surface, the second character being consecutive to the first character within the string of characters; and
- a second displaying for displaying, in the recognition area, a first part of the string of characters ending with the first character while masking, in the insertion area, a second part of the string of characters starting with the second character;
- detecting at least one input stroke entered manually in the insertion area;
- performing handwriting recognition to convert the at least one detected input stroke into at least one recognised character;
- inserting, at the position within the string of characters, the at least one recognised character; and
- a first scrolling for scrolling the string of characters in the recognition area so as to display, in the recognition area, at least part of the at least one recognised character inserted into the string of characters.

The method of the present disclosure allows efficient and user-friendly insertion of additional characters into an existing string of characters at an appropriate position therebefore, therein or thereafter. Accordingly, input of additional characters in a natural and relatively quick manner is provided.

In particular, when deciding whether (and where) characters should be inserted, a user may easily inspect the content of an existing character string as a large area of the touchscreen is used to display the string being inspected.

Further, easy selection of the position at which insertion is to be carried out can be achieved thanks to the present teachings. By performing a simple and intuitive user interaction with the touchscreen, the user may initiate an insertion sequence to insert characters within an existing character string.

Character insertion may be carried out without the need for complex or difficult to remember gestures. The user may easily remember the procedure for performing character insertion according to the system and method of the present disclosure. The user may insert additional characters directly in the input area destined for handwriting input. In particular, the present system and method obviates the need for inserting additional characters using an input field separate from the input area of the digital device.

In a particular embodiment, the method comprises detecting, as the interaction, an interaction performed by a user by contacting the input surface.

In a particular embodiment, the detecting comprises:
comparing a pattern of the detected interaction with at least one predefined interaction pattern; and
if the pattern of the detected interaction matches one of the at least one predetermined interaction pattern, performing the selecting and the second displaying in response to the interaction.

In a particular embodiment, the selected position is determined based on the position of the interaction on the input surface relative to the characters displayed on the output surface in the first displaying.

In a particular embodiment, the interaction is detected in at least one of:
the recognition area;
the insertion area; and
a content display field displaying, on the output surface, at least a portion of the string of characters including the first and second characters.

In a particular embodiment, the interaction is a predetermined gesture performed in contact with the input surface or a predetermined multi-tap interaction on the input surface.

In a particular embodiment, the interaction includes a substantially vertical gesture performed in contact with the input surface so as to intersect a region of display of the string of characters on the input surface during the first displaying.

In a particular embodiment, the second displaying comprises, in response to the interaction, an automatic scrolling of the string of characters so as to move the first character to a side of the recognition area adjacent to the insertion area.

In a particular embodiment, the second displaying comprises, in response to the interaction:
if the first character is in the insertion area upon detection of the interaction, an automatic scrolling of the string of characters so as to move the first character from the insertion area into the recognition area.

In a particular embodiment, the recognition area and the insertion area are adjacent to each other.

In a particular embodiment, the string of characters comprises a plurality of words of at least one character, the method further comprising:
during the first displaying, displaying each word positioned in the recognition area and each word positioned in the recognition area.

In a particular embodiment, in the first scrolling, the string of characters is scrolled in a direction from the insertion area to the recognition area so as to display, in the recognition area, at least part of the at least one recognised character inserted into the string of characters.

In a particular embodiment, the first scrolling is performed automatically after the detecting of the at least one input stroke.

In a particular embodiment, the first scrolling is triggered automatically upon detection that the handwriting recognition is completed.

In a particular embodiment, the method comprises a third displaying for displaying, in the insertion area, the detected at least one input stroke while the handwriting recognition is being performed.

In a particular embodiment, the first scrolling comprises:
inserting, at the position within the string of characters, the detected at least one input stroke; and
scrolling the string of characters in the recognition area so as to display, while the handwriting recognition is being performed, at least part of the inserted at least one input stroke in the recognition area.

In a particular embodiment, the first scrolling comprises:
replacing the inserted at least one input stroke being displayed in the recognition area with the at least one recognised character once the handwriting recognition is completed.

In a particular embodiment, in the first scrolling, the at least one inserted character is displayed as typeset text in the recognition area.

In a particular embodiment, the method comprises, after the first scrolling, a second scrolling to cause display of the string of characters extending from the recognition area to the insertion area.

In a particular embodiment, the input surface and the output surface are formed by a touchscreen included in the digital device.

According to another aspect, the present disclosure relates to a non-transitory computer readable medium having a computer readable program code embodied therein, the computer readable program code being adapted to be executed to implement a character input method in a digital device comprising an input surface for inputting characters and an output surface for displaying characters, the output surface comprising a recognition area and an insertion area, the method comprising:
a first displaying for displaying a string of characters using the recognition area and the insertion area as a display region for the first displaying;
in response to an interaction of a user with the input surface, selecting a position within the string of characters between a first character and a second character displayed on the output surface, the second character being consecutive to the first character within the string of characters; and
a second displaying for displaying, in the recognition area, a first part of the string of characters ending with the first character while masking, in the insertion area, a second part of the string of characters starting with the second character;
detecting at least one input stroke entered manually in the insertion area;

performing handwriting recognition to convert the at least one detected input stroke into at least one recognised character;

inserting, at the position within the string of characters, the at least one recognised character; and a first scrolling for scrolling the string of characters in the recognition area so as to display, in the recognition area, at least part of the at least one recognised character inserted into the string of characters.

The computer program (or computer program product) of the disclosure can be expressed in any programming language, and can be in the form of processor-executable instructions, source code, object code, or any intermediary code between source code and object code, such that in a partially-compiled form, for instance, or in any other appropriate form.

The disclosure also provides a computer readable program code as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the disclosure can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

The present disclosure also concerns a system a system for providing input of characters to a digital device, the digital device comprising a processor, an input surface for inputting characters and an output surface for displaying characters, the output surface comprising a recognition area and an insertion area for accepting character input, and at least one non-transitory computer readable medium, the at least one non-transitory computer readable medium configured to, under control of the processor:
- a display module for displaying a string of characters using the recognition area and the insertion area as a display region for the first displaying;
- a selection module for selecting, in response to an interaction of a user with the input surface, a position within the string of characters between a first character and a second character displayed on the output surface, the second character being consecutive to the first character within the string of characters;
  - wherein the display module is configured to display, in the recognition area, a first part of the string of characters ending with the first character while masking, in the insertion area, a second part of the string of characters starting with the second character;
- a detection module for detecting at least one input stroke entered manually in the insertion area;
- a recognition module for performing handwriting recognition to convert the at least one detected input stroke into at least one recognised character;
- an insertion module for inserting, at the position within the string of characters, the at least one recognised character; and
  - wherein the display module is configured to scroll the string of characters in the recognition area so as to display, in the recognition area, at least part of the at least one recognised character inserted into the string of characters.

In a particular embodiment, the system or device comprises a touchscreen, the input surface and the output surface being formed by the touchscreen.

The various embodiments defined above in connection with the character input method of the present disclosure apply in an analogous manner to the non-transitory computer readable medium, to the system and to the digital device of the present disclosure.

BRIEF DESCRIPTION OF THE DRAWINGS

Other characteristics and advantages of the present disclosure will appear from the following description made with reference to the accompanying drawings which show embodiments having no limiting effect. In the figures.

Figure 1:
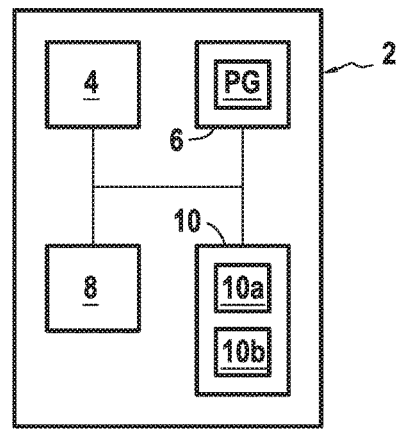
FIG. 1 is a diagram of a digital device according to a particular embodiment of the disclosure.

The components in the figures are not necessarily to scale, emphasis instead being placed upon illustrating the principles of the present disclosure.

For simplicity and clarity of illustration, the same reference numerals will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a digital device, a character input method and a corresponding computer program on a computer-readable medium are discussed.

As indicated earlier, the present disclosure relates generally to the field of electronic devices capable of recognizing user input handwriting of various characters, and concerns more particularly a digital device and corresponding method for inserting one or several characters into a string of characters. The disclosed digital device and method are based on computer technology to overcome problems specifically arising in user interfaces, including the problem of how to accurately and precisely insert hand-written characters into existing text that is displayed on the user interface of a digital device. Thus, the disclosed digital device and method improve the ability of a computer to display character information and interact with the user.

In the present document, a "character" is understood broadly as referring to any kind of text and non-text character, symbol or the like, including two or more characters. A character may be, for instance, an alphanumeric character, a letter, a number, a word, a grammatical mark, a sign, a space character or any combination thereof, although other types of characters may be contemplated. Further, the use of the term 'text' in the present document is understood as encompassing all alphanumeric characters, and strings thereof, in any written language and commonplace non-alphanumeric characters, e.g., symbols, used in written text. Furthermore, the term 'non-text' in the present document is understood as encompassing free-form handwritten or hand-drawn content and rendered text and image data, as well as non-alphanumeric characters, and strings thereof, and alphanumeric characters, and strings thereof, which are used in non-text contexts.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the accompanying drawings. The examples shown in the drawings are in a left-to-right written language context, and therefore any reference to positions can be adapted for written languages having different directional formats.

The term handwriting is used herein to define the creation of digital content by users through use of their hands or finger either directly onto a digital or digitally connected medium (e.g., a touchscreen) or via an input tool, such as a hand-held stylus. The term "hand" is used herein to provide concise description of the input techniques, however the use of other parts of a users' body for similar input is included in this definition, such as foot, mouth and eye.

Figure 2:
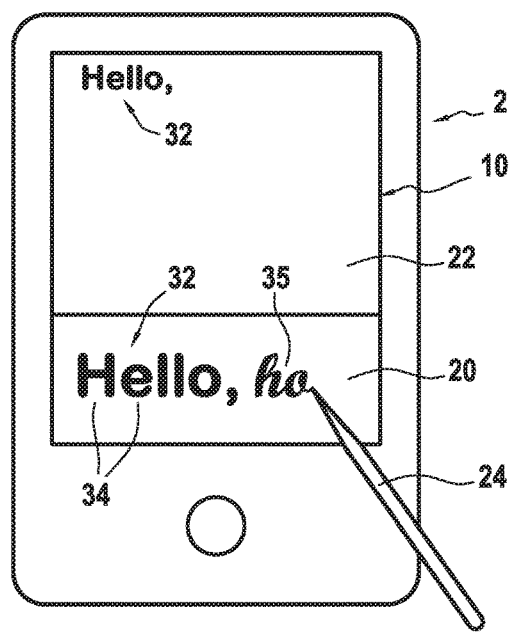
FIG. 2 depicts the digital device of FIG. 1, according to a particular embodiment.

FIGS. 1 and 2 show in a schematic manner a computing or digital device 2 according to a particular embodiment of the disclosure. The device 2 described in this example is a smartphone comprising a touchscreen 10. The user may interact with the touchscreen 10 using his/her finger or a stylus 24 (or the like) to input characters 34 using handwriting.

It can be understood that the device 2 may be in the form of any appliance (portable or otherwise) comprising a touch sensitive surface and suitable for implementing the character input method according to the present disclosure (desktop PC, tablet PC, personal digital assistants, etc.).

As depicted in FIG. 1, the device 2 has a processor 4, a rewritable non-volatile memory 6 (e.g., a flash memory or the like), a RAM memory 8 and an input-output interface 10 allowing input and display of characters. The input-output interface 10 is a user interface allowing handwriting input of characters and display of the inputted characters in any appropriate form. In the particular embodiment depicted in FIG. 1, the input-output interface 10 has a display 10a for displaying characters and an input surface 10b for inputting characters on the display 10a. In a particular embodiment, the input surface 10b is a touch sensitive surface. In another embodiment, the input surface 10b is a proximity sensitive surface configured to detect a body part (e.g., a finger) or an instrument (e.g., a stylus) near the surface 10. Using such a proximity sensitive surface, character input can be achieved without any physical contact. In another embodiment, the input surface 10 is a projected surface formed using a projector (e.g., a touch projector). A touch projector may for instance be configured to project an array of virtual 'keys' on any suitable surface such as a table or a white board so that a user can interact with the projected array of keys. In the present example, the input-output interface 10 is a touchscreen. Other embodiments may be contemplated wherein the display 10a and the input surface 10b are separate components of the device 2 or of separate, connected devices.

The non-volatile memory 6 of the device 2 constitutes a computer usable medium (or recording medium) in accordance with a particular embodiment of the disclosure. The memory 6 includes a computer program (or computer-readable program code or the like) PG according to a particular embodiment of the disclosure, this computer program having processor-executable instructions to implement a method or operations according to a particular embodiment of the invention.

The computer program PG may include instructions for recognising handwriting input to the device 2 or the device 2 may be connected to a remote system for recognising input handwriting. The handwriting recognition processing utilizable by the present system and method may take the form of known handwriting recognition methods or specific methods such as using a neural network as described, for example, in PCT Patent Application Publication No. WO 2014/174219, International Appl. No. PCT/FR2014/050991, filed on 24 Apr. 2014, in the name of the present Applicant and Assignee, the entire contents of which is incorporated by reference herein.

As depicted in FIG. 2, the touchscreen 10 of the device 2 includes a first area 22 (which is a content display field or zone in this example) and a second area 20 (which is a content input field or zone). The input area 20 is interactive, and as such a user may input the characters 34 in the input area 20, thereby forming a string 32 of characters, using for instance the stylus 24. In the present example, the string 32 of characters 34 forms text having a plurality of words with a grammatical mark, being a comma in this example. As can be seen, in the present example the input area is configured to allow several characters or words of text to be displayed at once. Upon receipt of input using the present system and method the handwritten input is rendered in a well understood manner as so-called 'digital ink' (e.g., as ink objects that display the handwriting in its form as input, capturing the movement of the stylus 24) in the input area 20. The digital ink represents the strokes input by the user, and the handwritten strokes are processed to recognise the content— e.g., to recognize specific characters. The output recognition results are rendered in a well understood manner as so-called 'typeset ink' (e.g., as digital objects displayed as typeset font text) which replaces the previous digital ink versions of the recognised content.

For example, as shown in FIG. 2, in the character string 32 displayed in the input area 20 the handwritten input forming the word "Hello" and the comma "," has been recognition processed and the recognition results displayed as the typeset ink version of the characters 34. However the handwritten input forming the characters "ho" has yet to be recognition processed as the pen-up event is yet to occur, for example, and so the input characters 35 are rendered as digital ink. Although it is useful to display the recognised content to the user in the input area 20, as this provides handwriting recognition feedback during input, the present system and method may display the input in digital ink only, or provide users with the ability to select the display of digital or typeset ink through gesture input or a menu display, for example.

As will be discussed later, the input area 20 is formed in this example of two regions, i.e. a recognition area 28 and an insertion area 30.

In the present embodiment, the content display field 22 is also provided on the touchscreen 10, such that the content display field 22 is interactive. The content display field 22 is configured to display, e.g., in a larger area than the input area 20 using for instance smaller text font, a representation of the character string 32 input by the user in the input area 20.

In the present example, the content display area 22 is configured to allow several lines of text to be displayed at once with suitable reflow of words and sentences, for example. In this way, users are provided with display of their input content despite the constrained configuration or size of the input area 20. Alternatively, the content display area 22 may provide display of a single line of content in smaller font that the input area 20 for example and provide a scrolling display of that content as more content is input or through user interaction therewith, such as with gestures. The text in the content display field 22 is generally rendered in a well understood manner as digital objects, e.g., in typeset ink, as recognised by the present system and method from the handwritten input 34.

For example, in FIG. 2, in the character string 32 displayed in the content display area 22, the recognised content forming the word "Hello" and the comma "," is displayed as the typeset ink version of the characters 34, as displayed in the input area 20, however the handwritten input forming the characters "ho" in the input area 20 has yet to be recognition processed and so the corresponding characters are not yet displayed in the content display area 22. Although it is useful to display the recognised content to the user in the content display area 22 as this provides context for continued input, the digital device according to the present disclosure may be implemented without inclusion of such a (recognised) content display or the present system and method may provide users with the ability to select whether or not to the display of the content display area 22 in addition to the input area 20. Further, the present system and method may display the content in the content display area 22 as digital ink instead, or provide users with the ability to select the display of digital or typeset ink, for example, through gesture input or menu display.

According to a particular embodiment, the device 2 may operate according to an insertion mode to allow the user to insert at least one new character within a string of characters. The insertion mode may for instance be a functionality implemented by the device 2 in response to receipt of a pre-defined command. In some implementations, the pre-defined command may be a multi-position interaction; that is, input of a gesture such as a multi-finger press or a swipe (as further discussed below). For example, a user may use the device 2 in a normal input mode to handwrite characters in the input area 20 and, switch the device 2 to the insertion mode by gesturing (or by any other predefined interaction) on the touchscreen 10 in order to edit the previously input characters by inserting therein at least one additional character.

Figure 3:
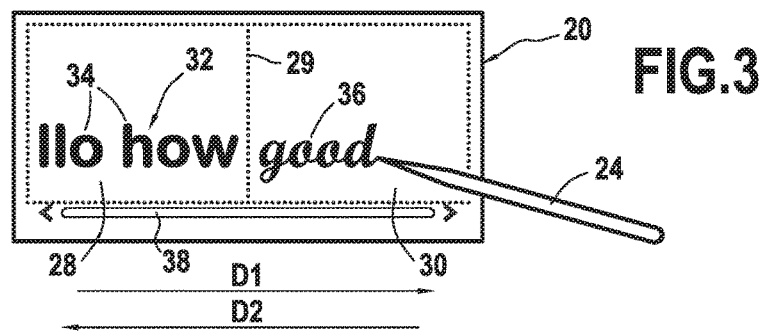
FIG. 3 depicts an input area of a user interface of a digital device, according to a particular embodiment.

FIG. 3 illustrates the input area 20 during operation of the device 2 in the insertion mode, according to a particular embodiment. As shown in FIG. 3, the input area 20 is formed by a recognition area 28 and an insertion area 30. As will be described in more detail further below, providing the user with the insertion area 30 in addition to the recognition area 28 permits easy and efficient insertion of new characters into an existing string of characters when the device 2 operates in an insertion mode.

In the insertion mode, the recognition area 28 is configured to display the part of the character string 32 which generally corresponds to the recognized content of previous input, as discussed earlier and as shown in FIG. 3, while the insertion area 30 is configured as a portion of the input in which at least one new stroke 36 input by a user in handwriting is detected by the device 2 and rendered as digital ink in the insertion area 30. Once handwriting recognition has been performed on the newly input stroke(s) 36 and/or when the insertion mode is ceased, which returns the device 2 to input mode, the recognition area 28 displays the character string 32 with at least one character recognised from the detected input stroke 36 inserted and the digital ink version in the insertion area 30 is omitted from display.

When the device 2 operates according to the insertion mode, a separation marker 29 may be displayed and, positioned in this particular example at a boundary between the recognition area 28 and the insertion area 30. Although this separation marker 29 may be useful to help the user in identifying the delimitation between the recognition area 28 and insertion area 30, the present system and method may be implemented without displaying this separation marker 29.

In FIG. 3, the separation marker 29 is represented by a dashed line, however other display renderings of the marker are possible. The separation marker 29 may for instance be an indicator displayed on the input area 20, such as a line, cursor, arrow or the like.

As will be discussed in further detail below, the position (so-called "insertion position") within the character string 32 at which at least one new character is to be inserted may be selected based on a user interaction with the touchscreen 10. Upon detection of this particular user interaction, the device 2 may switch to the insertion mode depicted in FIG. 3 to allow the user to input additional characters at the insertion position, using the insertion area 30 and recognition area 28 as discussed above.

As shown in FIG. 3, an interactive scrolling actuator 38 (taking for instance the form of a scrollbar, as in FIG. 3, scrolling buttons or the like) may be provided, for instance in or in the vicinity of the input area 20, to allow scrolling of the string 32 of characters 34 in the input area 20 in a first direction D1 (to the right in this example) and in a second opposite direction D2 (to the left in this example) through user gesture, such as a swipe gesture, for example. Other methods for commanding scrolling in the input area 20 are possible.

It should be understood that the particular disposition (form, layout, etc.) of the overall user interface of input area 20, including the recognition area 28, insertion area 30, scrolling actuator 38 and separation marker 29, as depicted in FIG. 3, constitutes a mere example and should not be construed as limiting in any way the scope of the present disclosure.

In a particular example, the recognition area 28 and the insertion area 30 are adjacent one other. Other dispositions are however possible according to the present disclosure. In particular, the relative disposition of the recognition area 28 and the insertion area 30 may be adapted to the intended use, such as the form factor of the computing device, and the type and/or format of the language when the device 2 is used for displaying and editing text or the like. Arrangement of the user interface may for instance be adapted to allow easy and efficient interaction with a user depending on whether characters are input in English, Japanese, Chinese, or some other character set.

Figure 4:
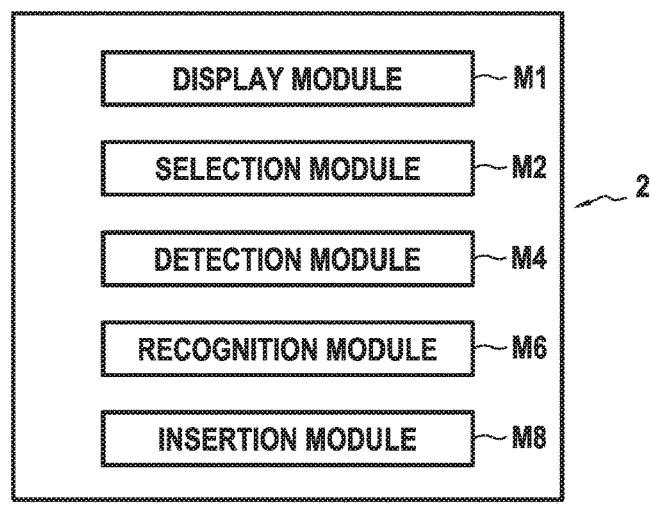
FIG. 4 is a block diagram showing modules implemented by the digital device of FIG. 1, according to a particular embodiment.

In the present embodiment, when running the computer program PG stored in the memory 6, the processor 4 implements a number of processing modules depicted in FIG. 4, that is: a display module (or display control module) M1, a selection module M2, a detection module M4, a recognition module M6 and an insertion module M8. It should be understood that these particular processing modules M1 to M8 constitute a mere illustrative example of implementation of the present disclosure. Various implementations of processing modules may for instance be contemplated by a person skilled in the art to implement an input method in accordance with the present disclosure.

In the present example, the display module M1 may be configured to control the display on the touchscreen 10. More particularly, when the device 2 operates in a normal input mode, the display module M1 may be operable to display an existing string 32 of characters 34 extending from the recognition area 28 into the insertion area 30. As will be discussed further below, by using the recognition area 28 as well as the insertion area 30, the character string 32 can be displayed within a large space, thereby facilitating an improved process of searching for an insertion position within the character string 32 at which at least one character is to be inserted.

The display module M1 may be configured to scroll the character string 32 within the input area. In the present embodiment, scrolling may be performed in two opposite directions D1 and D2 as illustrated by the arrows shown in FIG. 3. Scrolling may be performed either automatically by the display module M1 under control of the processor 4, for example, or in response to a scrolling command received from the user, e.g., through interaction with the scrolling actuator 38 or by any other suitable interaction.

By scrolling the character string 32 while the device 2 operates in the input mode, the user may search through the characters 34 of the string 32 and command the display, in the input area 20, of a portion of interest of the string 32 in which at least one character is to be inserted.

The selection module M2 may be operable to select, in response to a particular interaction of a user with the touchscreen 10, a position (i.e., an "insertion position") within the string 32 of characters 34 between a first character and a second character displayed on the touchscreen 10, wherein the second character is consecutive to the first character within the character string 32. Selecting the insertion position allows defining where character insertion is to be performed within the string of characters.

In the present embodiment, upon detection of this particular user interaction, the device 2 is configured to switch into the insertion mode allowing insertion of at least one character into the selected insertion position.

As will be discussed further below, various user interactions with the touchscreen 10 are possible to trigger selection of a particular insertion position within the character string 32. This user interaction may be a predetermined gesture (e.g. a swipe or the like) performed in contact with or near the touchscreen or a predetermined multi-point interaction (e.g., a double or triple tap) on the touchscreen. This interaction may be performed in the recognition area 28, in the insertion area 30, and/or in the content display field 22 for instance.

The display module M1 may be further configured to display in the recognition area 28, in response to the above-mentioned user interaction, a first part of the character string 32 ending with the first character (i.e., the character 34 immediately preceding the selected insertion position) while masking (or otherwise omitting from display), in the insertion area 30, a second part of the character string 32 starting with the second character (i.e., the character 34 of string 32 immediately succeeding the selected insertion position). As will be further discussed below, masking the second character and any succeeding character of the character string 32 allows accommodation of room in the insertion area 30 for allowing character input by the user within the insertion area 30.

As will be also discussed below, once the insertion position within the character string 32 is selected, the display module M1 may be configured to scroll the character string 32 in the direction D2 shown in FIG. 3 (from the insertion area 30 toward the recognition area 28) to position the first character within the recognition area 28, for instance on a side of the recognition area 28 adjacent the insertion area 30.

The detection module M4 may be operable to detect at least one input stroke 36 in the insertion area 30 while the device 2 operates in the insertion mode.

The recognition module M6 is operable to perform, or cause to be performed, handwriting recognition based on the detected input stroke(s) 36 so as to produce at least one recognised character.

The insertion module M8 is operable to insert, at the insertion position previously selected within the character string 32, at least one character recognised by the recognition module M6 based on the detected input stroke(s) 36.

The display module M1 may also be configured to automatically scroll the character string 32 in the recognition area 28 so as to display, in the recognition area 28, at least part of the one or more recognised characters inserted into the character string 32. As further discussed below, this automatic scrolling provides the accommodation of room within the insertion area 30 once handwriting recognition of detected input stroke(s) entered in the insertion area 30 is completed, thereby allowing for a continuous input of character(s) to be inserted at the selected insertion position.

In a particular embodiment, the disclosed embodiments may be implemented using software and/or hardware components. In this context, the term "module" can refer in this document to a software component, as well as a hardware component or a plurality or combination of software and/or hardware components.

A character input method implemented by the device 2 illustrated in FIGS. 1 to 4 is now described with reference to FIG. 5, in accordance with a particular embodiment of the present disclosure. More specifically, the device 2 implements this method by executing computer program PG stored in the memory 6. The character input method of this particular embodiment comprises:

- a first displaying (S2) for displaying a string 32 of characters 34 using the recognition area 28 and the insertion area 30 as a display region for the first displaying;
- in response to an interaction of a user with the touchscreen, selecting (S6) a position within the string of characters between a first character and a second character displayed on the touchscreen, the second character being consecutive to the first character within the string of characters; and
- a second displaying (S8) for displaying, in the recognition area, a first part of the string of characters ending with the first character while masking, in the insertion area, a second part of the string of characters starting with the second character;
- detecting (S10) at least one input stroke entered manually in the insertion area 30;
- performing (S12) handwriting recognition to convert the at least one detected input stroke into at least one recognised character;
- inserting (S14), at the insertion position within the character string 32, the at least one recognised character; and
- a first scrolling (S16) for scrolling the character string 32 in the recognition area 28 so as to display, in the recognition area 28, at least part of the at least one recognised character inserted into the character string 32.

In a particular embodiment, the separation marker 29 may define in real-time the separation between the recognition area 28 and the insertion area 30 while the device 2 operates according to the insertion mode.

Figure 5:
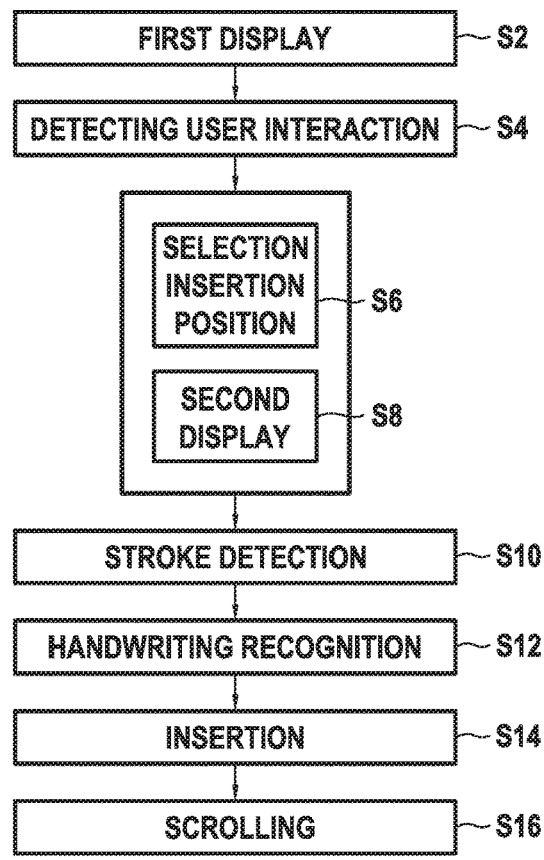
FIG. 5 is a flow chart showing a character input method according to a particular embodiment of the present disclosure.
Figure 6:
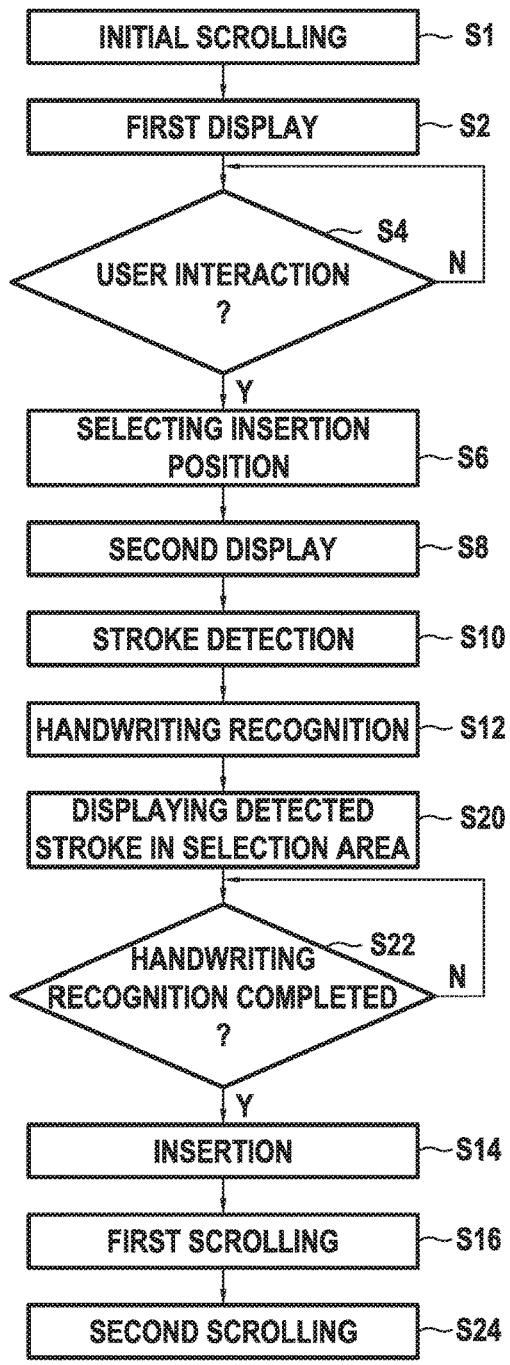
FIG. 6 is a flow chart showing a character input method according to a particular embodiment of the present disclosure.

A character input method as illustrated in FIG. 5 is now described in more detail in a particular embodiment with reference to FIGS. 6 and 7A-7G. More specifically, the device 2 implements this method by executing the computer program PG stored in the memory 6 in this example.

It is assumed in this example that the device 2 allows input and editing of text characters, although other types of characters may be contemplated.

As an initial state, it is assumed in this example that a user has previously inputted into the device 2 the following string 32 of characters 34:

"Hello how are you?"

Figure 7A:
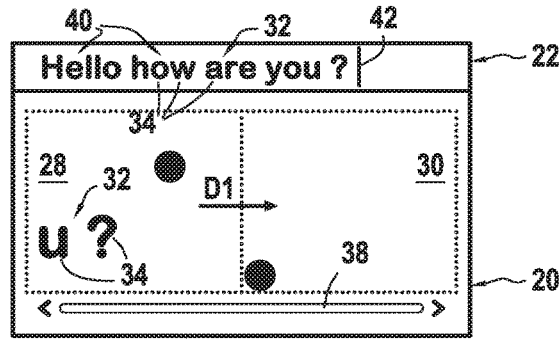
FIG. 7A depicts a user interface during the character input method according to a particular embodiment of the present disclosure.

The character string 32 is made of words 40 and the grammatical mark "?", each word being made up of at least one character 34, as illustrated in the content display area 22 in FIG. 7A, for example.

In the present example, the user may for instance have inputted the above character string 32 (or sentence) by contacting the input area 20 with his/her finger, the stylus 24 or the like. To this end, the device 2 may for instance operate in a (normal) input mode allowing the user to input characters in the input area 20 using any user interface appropriate for inputting characters such as text. For instance, in the normal input mode, the input area 20 does not have an insertion area 30, thereby allowing a larger recognition area 28 to be displayed for easier and more accurate character input by the user.

In a variant, the string 32 of characters 34 has been previously entered into the device 2 by any appropriate method or means. The character string 32 may have been previously stored in the device 2, by the memory 6 for example. In another example, the device 2 may be configured to receive, by any appropriate transmission technique, the string 32 "Hello how are you?" from another terminal or device.

As shown in FIG. 7A, in an initial state, the string 32 is displayed in the content display area or field 22 in a format which allows easy visualisation, viewing, or reading by the user. A cursor 42 appearing in the content display area 22 may indicate a current active position within the string 32 of characters 34.

It is now assumed that the user inspects the content of the existing character string 32 to determine whether editing should be performed to insert one or more additional characters into the string 32. Although reference is made, in the following part of the description related to this user inspection, to the insertion area 30 and the recognition area 28, these areas are not used for the respective purposes of inputting strokes and recognising the inputted strokes at this stage since the device 2 operates according to the input mode.

Figure 7B:
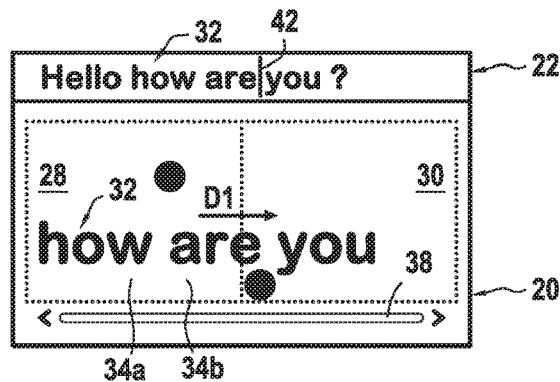
FIG. 7B depicts a user interface of a computing device during the character input method according to a particular embodiment of the present disclosure.
Figure 7C:
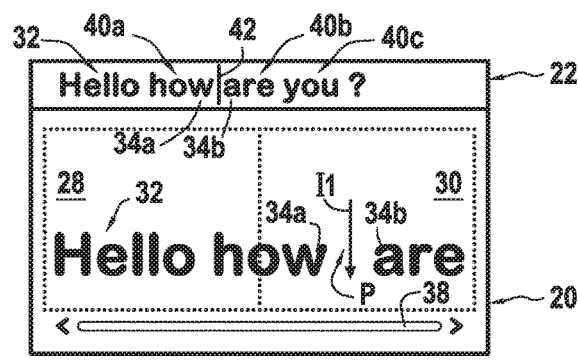
FIG. 7C depicts a user interface during the character input method according to a particular embodiment of the present disclosure.

In the present example, an initial scrolling (S1) of the character string 32 is performed while the device 2 operates in the normal input mode, as shown in FIGS. 7A-7C. The recognition area 28 and the insertion area 30 (i.e., the input area 20) are used as a display region for the initial scrolling S1. Such an initial scrolling S1 may be necessary, for instance, if the recognition area 28 and the insertion area 30 does not provide sufficient room to display simultaneously the entire character string 32 or if the user wishes to move the character string 32 in the input area.

By scrolling in S1 the character string 32 while the device 2 operates in the input mode, the user may check the content of the character string 32 displayed in the input area 20 and determine a position (the so-called "insertion position" hereinafter) within the string 32 at which one or more additional characters are to be inserted.

In the present example depicted in FIGS. 7A-7C, the initial scrolling in S1 is performed in the direction D1, although, in other examples, the initial scrolling S1 may involve scrolling in direction D2, or alternatively in directions D1 and D2 while the user searches for the appropriate position at which character(s) should be inserted.

The initial scrolling S1 may be performed either automatically by the display module M1 under control of the processor 4, for example, or in response to a scrolling command received from the user, e.g., through interaction with the scrolling actuator 38 or by any other suitable interaction. In the present example, the user may for instance use a multi-position interaction with the user interface, such as touching two fingers as represented in FIGS. 7A-7B by the two dots in the vicinity of the arrow pointing in the direction D1. During the initial scrolling S1, the user may thus scroll backward through the string 32 of characters 34 to search for a specific position within the string 32 where at least one character is to be inserted.

As shown in the particular example of FIGS. 7A and 7C, in response to a scrolling command received from the user, the device 2 performs an initial scrolling S1 of the character string 32 in the direction D1 across the recognition area 28 and the insertion area 30. FIG. 7A shows a state where a part "u?" of the character string 32 is only apparent in the recognition area 28. The initial scrolling S1 causes the character string 32 to gradually move in the direction D1 such that the string 32 extends from the recognition area 28 to the insertion area 30, as shown in FIGS. 7B-7C.

The FIG. 7C shows a state at the end of the initial scrolling S1 wherein the word "Hello" and a first part of the word "how" are displayed (S2) in the recognition area 28 while the remaining part of the word "how" and the subsequent word "are" are displayed (S2) in the insertion area 30.

It should be appreciated, however, that other embodiments of the present method and system are possible in which no initial scrolling S1 is performed. This may be the case, for instance, if the insertion position within the character string 32 at which character insertion is to be made is already displayed as an initial state in the input area 20, such that no initial scrolling S1 is needed. In that case, the method may directly start at S2.

In the displaying step S2 shown in FIG. 7C, the device 2, operating in the input mode, displays the character string 32 (or at least a part thereof) using the recognition area 28 and the insertion area 30 (i.e., the input area 20) as a display region for the first displaying S2. As indicated above, in the present example, the words "Hello how are" are displayed (S2) across the recognition area 20 and the insertion area 30.

In the displaying step S2, the user may check the content of the existing character string 32 displayed in the input area 20 and determine whether one or more new characters should be inserted at a particular position within the portion of the character string 32 being displayed.

Using the recognition area 28 and the insertion area 30 (instead of only the recognition area 28, for instance) as a display region in S1 and S2 facilitates and improves the review of the existing character string 32 by the user as a large area is used for display on the touchscreen 10. The character string 32 may advantageously extend from the recognition area 28 to the insertion area 30 (i.e., across the recognition area 28 and insertion area 30). The user may thus easily and efficiently determine an insertion position within the character string 32 at which at least one additional character is to be inserted.

It is now assumed that the user decides to insert at least one character at an insertion position P between the first character "w" (noted as 34a) at the end of the word "how" and the second character "a" (noted as 34b) at the beginning of the word "are", as shown in FIG. 7C. In the present example, it is assumed that the second character 34b is consecutive to the first character 34a within the character string 32 (the space separating the words "how" and "are" is therefore not considered as a character as such for a matter of simplicity, in this example, but other implementations may vary).

To do so, the user performs a predefined interaction with the touchscreen 10 to select the position P as the insertion position within the character string 32. In the present embodiment, the user performs the predefined interaction with the device 2 by contacting the touchscreen 10, using a finger(s), a stylus or the like. The term "predefined" is understood to include pre-definition within the present system and method itself and/or user settable definition, e.g., via user interface (UI) menus and the like.

As described earlier, other embodiments are possible where the input surface 10b is not part of a touchscreen. As indicated previously, the input surface may for instance be a projected area formed by a projector on a surface. In a variant, the input surface 10b is a proximity sensitive surface. In that case, the above-mentioned interaction to select the position P may consist in placing a finger(s), a stylus or the like near the surface of the touchscreen 10 so that the presence of the finger, stylus or the like can be detected. In the following description, "contacting" or "in contact with" should be understood as covering the variant "near the surface of". As also indicated earlier, although the input surface 10b and the output surface 10a are formed by a touchscreen in the present example, other embodiments may be contemplated where the input surface 10b and output surface 10a are separate components of the device 2 or of separate, connected devices.

Easy and efficient selection of the insertion position P within the character string 32 can be made by performing a simple and intuitive interaction with the touchscreen. No further interaction by the user is necessary to allow selection of the insertion position P.

As further discussed below, various user interactions are possible to command selection of a particular position P as the insertion position within the character string 32. The predefined interaction performed by the user may be on any appropriate part of the touchscreen including at least one of:
- the recognition area 28;
- the insertion area 30; and
- the content display field 22 displaying, on the touchscreen 10, at least a portion of the string 32 of characters 34 including the first and second characters 34a, 34b.

In a particular embodiment, the predefined interaction performed by the user to command selection of the insertion position P is a predetermined gesture performed in contact with the touchscreen 10 or a predetermined multi-point interaction (e.g., a double-tap or triple-tap) on an appropriate part of the touchscreen 10.

In the present example, it is assumed that the predefined interaction performed by the user to command selection of the insertion position P is a gesture I1 performed by contacting the input area 20.

Various gestures may be predefined to implement the present system and method. As shown in the example of FIG. 7C, the predefined gesture is a vertical (or substantially vertical) gesture (a swipe or the like) performed in contact with the input area 20 so as to intersect a region of display of the character string 32 on the touchscreen 10 during the displaying step S2. In the present example, this vertical gesture is performed downwardly, although an equivalent gesture in the upward direction could likewise be implemented.

In a detection step S4, the selection module M2 of the device 2 determines whether the predefined user interaction I1 is detected. In the affirmative, the method proceeds to S6.

Various embodiments are possible to perform the detection step S4. In a particular embodiment, the device 2 determines in S4 whether a user interaction is detected with the input area 20. In case such a user interaction is detected, the selection module M2 compares the pattern of the detected user interaction with at least one predefined interaction pattern. Such a predefined interaction pattern may be stored either locally in the device 2 or stored remotely for later access by the device 2. The pattern comparison may be performed based on any conventional feature analysis technique. If the pattern of the detected interaction I1 matches a predefined interaction pattern, the device 2 proceeds to step S6.

In the present example, the selection module M2 may for instance determine in S4 whether the user interaction I1 is a gesture along a straight line and, in the positive case, determine the average direction of this straight line. The device 2 may proceed to step S6 only if the detected gesture is a vertical (or substantially vertical) gesture (e.g., a downward swipe) performed in contact with the input area 20 so as to intersect a region of display of the character string 32 on the touchscreen 10 during the displaying step S2.

In the selection step S6, in response to the user interaction I1 detected in S4, the device 2 switches to the insertion mode and the selection module M2 selects the position P defined earlier as the insertion position at which at least one character is to be inserted with the character string 32.

Various implementations are possible to identify the insertion position P based on the detected user interaction I1. In a particular embodiment, the selection module M2 determines in S6 the insertion position P to be selected based on the position of the detected user interaction I1 on the touchscreen 10 relative to the characters 34 which have been displayed in S2.

In the present example, the selection module M2 may for instance determine the lateral position of the vertical gesture I1 detected in S4 along the general direction of the character string 32 and determine, based on this lateral position, which character 34 is intersected by the vertical gesture I1 so as to deduce therefrom the inserting position P to be selected.

In the present example, the selection module M2 is configured such that, in the selection step S6, the insertion position P selected within the string 32 is a position immediately following the character 34 intersected by the vertical gesture I1 detected in S4. In another example, the insertion position P selected in S6 is a position immediately following the word intersected by the vertical gesture I1 detected in S4.

In the present example, the insertion position P is located within a space between two consecutive words, i.e. within the space separating the word "how" from the subsequent word "are". In another example, the insertion position P selected at S6 may be located within a word, i.e. between two consecutive characters of a same word (e.g., between the letter "h" and the letter "o" of the word "how"). The location of the insertion position P may vary depending on the user interaction detected in S4 and on the configuration of the device 2.

In the present example, it is assumed that the selection module M2 selects in S6 the insertion position P between the consecutive characters 34a and 34b, as shown in FIG. 7C.

In this example, the cursor 42 in the content field 22 is positioned at this same position P within the character string 42 to facilitate visualisation by the user of the insertion position P where characters may be inserted.

In S8, the display module M1 displays in the recognition area 28 a first part of the character string 32 ending with the first character 34a while masking, in the insertion area 30, a second part of the character string 32 starting with the second character 34b. This second displaying step S8 may include automatically scrolling the character string 32 to adjust the position of the character string 32 within the input area. In some particular instances, such scrolling may not be needed as explained in more detail below.

In the present example, the user interaction I1 is performed in S4 such that the insertion position P is initially positioned in the insertion area 30 (FIG. 7C). In other examples, the insertion position P may be initially positioned in the recognition area 30 depending on how the user interaction I1 is performed in S4 on the touchscreen 10.

Figure 7D:
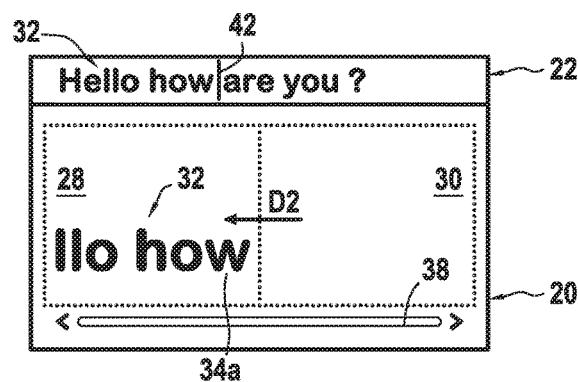
FIG. 7D depicts a user interface during the character input method according to a particular embodiment of the present disclosure.

In the particular example depicted in FIG. 7D, the display module M1 scrolls at S8 the character string 32 in the direction D2 (backward) so that the first part "llo how" of the character string 32 ending with the first character 34a (i.e., "w") is displayed in the recognition area 28 while the second part "are" of the character string 32 starting with the second character 34b (i.e., "a") is masked in the insertion area 30.

The above scrolling and masking operations performed in S8 allow the accommodation of room within the insertion area 30 for later stroke input by the user.

Whether the character string is scrolled or not at S8 may thus depend on the position of the selected insertion position P relative to the recognition area 28 upon detection S4 of the user interaction I1. Should the first character 34a happen to be already positioned within the recognition area 28 upon detecting (S4) the user interaction I1, scrolling in S6 may not be necessary. If, however, the first character 34a is in the insertion area 30 upon detection of the user interaction I1 in S4, the automatic scrolling of the character string 32 is performed so as to move the first character 34a from the insertion area 30 into the recognition area 28.

In a particular embodiment, the step S8 includes an automatic scrolling of the string of characters so as to move the first character 34a to a side of the recognition area 28 adjacent to the insertion area 30, as shown for instance in FIG. 7D. This automatic scrolling may be performed in the direction D1 or D2 depending on the position of the first character 34a upon detection of the user interaction I1 in S4. This automatic scrolling allows for an optimal positioning of the first part of the character string 32 ending with the first character 34a for easy stroke input by the user in the insertion area 30 later at S10 as described further below.

Once the second displaying step S8 is completed, the method proceeds to S10.

Figure 7E:
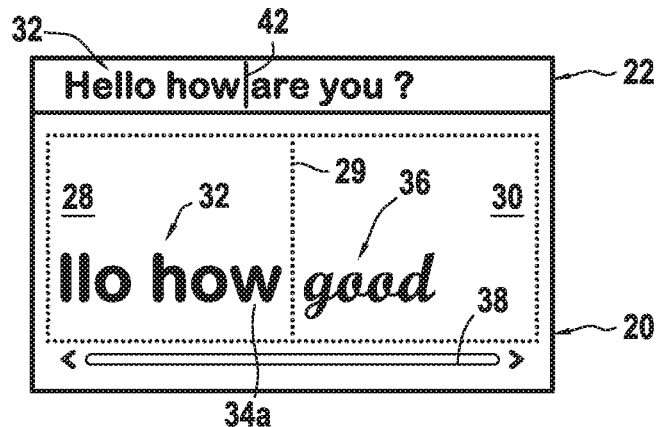
FIG. 7E depicts a user interface during the character input method according to a particular embodiment of the present disclosure.

As illustrated in FIG. 7E, the user then inputs manually in S10 at least one stroke 36 corresponding to the one or more characters (the handwritten word "good" in this case) that he/she wishes to insert at position P within the character string 32. Accordingly, in S10, the detection module M4, in this example, detects at least one input stroke 36 entered manually in the insertion area 30.

Stroke detection S10 may be performed in any suitable manner by the device 2.

As explained earlier, a separation marker 29 may be displayed to mark the delimitation between the recognition area 28 and the insertion area 30, although other embodiments without implementing such a separation marker 29 may also be contemplated. Displaying this separation marker 29 during stroke input in S10 may assist the user in identifying the position of the insertion area 30 in the touchscreen 10.

The recognition module M6 then performs (S12) handwriting recognition to convert the detected strokes 36 into at least one recognised character 50. In the present example, the recognition module M6 recognises the characters 50 forming the word "good". Handwriting recognition may be performed in any suitable manner by the device 2 as described earlier.

At this stage, different implementations of the present disclosure may be contemplated. In the present example, the detected input strokes 36 are displayed (S20) while the handwriting recognition S12 is in progress. This allows a temporary display of the handwritten text 36 as digital ink in the insertion area 30 (as shown in FIG. 7E).

In S22, the insertion module M8 detects whether or not the handwriting recognition S20 is completed. This detection may occur as a result of the recognition module M6 communicating directly or indirectly to the insertion module M8 that recognition is complete or upon output of the recognition result by the handwriting recognizer, for example.

Figure 7F:
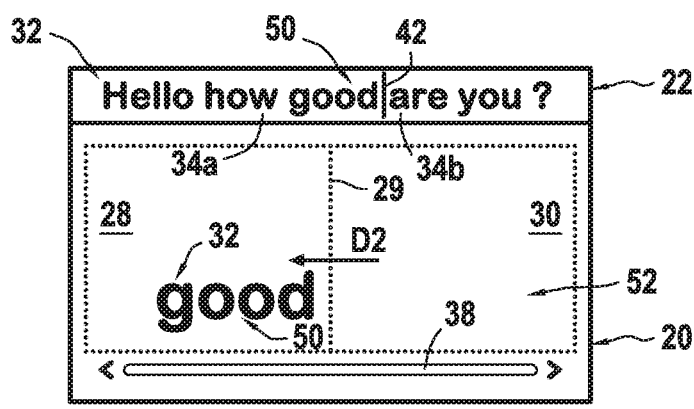
FIG. 7F depicts a user interface during the character input method according to a particular embodiment of the present disclosure.

As shown in FIG. 7F, once it is detected (S22) that the handwriting recognition S20 is completed, the insertion module M8 inserts (S14) the at least one recognised character(s) 50 at the insertion position P within the string 32 of characters 34 and the display module M1 scrolls (S16) the character string 32 in the direction D2 in the recognition area 28 so as to display, in the recognition area 28, at least part of the recognised characters 50 ("good" in this example) where they are inserted into the character string 32.

As can be seen for instance in FIG. 7F, the string 32 is scrolled back to the left so that the word "good" is apparent in the recognition area 28. The first scrolling S16 in direction D2 allows insertion space 52 to be accommodated within the insertion area 30 so as to allow additional stroke input within the insertion area 30.

In the present example, the first scrolling S16 is performed automatically by the display module M1 upon detection (S22) that the handwriting recognition S20 is completed.

In the present example, each recognised character 50 positioned in the recognition area 28 as a result of the scrolling S16 is displayed as text or typeset ink, as described earlier.

In the present example, the inserted characters 50 are also inserted at the insertion position P within the string 32 of characters 34 in the content field 22.

In a particular example, while the device 2 operates in the insertion mode, the cursor position in the content field 22 may be substantially continuously updated taking into account the latest visible character or word.

Figure 7G:
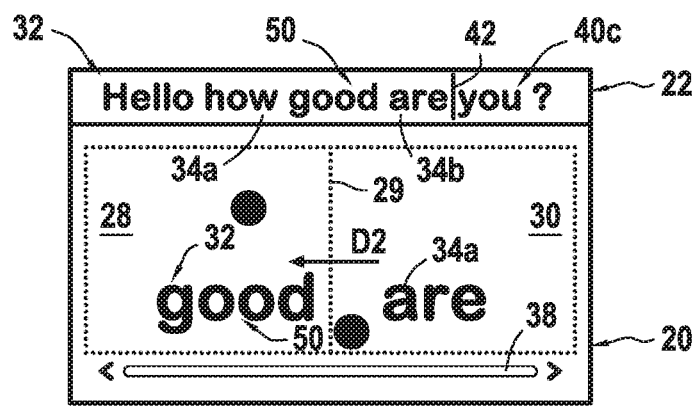
FIG. 7G depicts a user interface during the character input method according to a particular embodiment of the present disclosure.

As illustrated in FIG. 7G, after the first scrolling S16, a second scrolling (S24) in any direction (D1 or D2) may be performed to cause the device 2 to switch back to the input mode. In the present example, the second scrolling S24 is performed by the display module M1 in response to a command received by the user, in the same manner as already explained with reference to the initial scrolling S1.

In response to the second scrolling S24, the display module M1 displays in the insertion area 30 the part of the character string 32 which was previously masked in the insertion mode, that is, the part of the character string 32 directly succeeding the inserted word 50 ("good") that is present in the recognition area 28.

In the present example, as shown in FIG. 7G, the display module M1 now displays the word "are" in the insertion area 30 in response to the second scrolling S24.

The display module M1 may continue to scroll across the character string 32 according to a scrolling command received from the user.

Once the device 2 has switched back to the input mode, the user may scroll back or forward to look for another insertion position P or scroll forward to reach the end of the string character 32 so that new characters can be input in a normal manner.

Various other embodiments may be contemplated to enable the user to cause the device 2 to switch back to the normal input mode in S24. In another example, the device 2 is configured to switch back to the normal input back upon detection of a user interaction with the content display field 22 such as a tap (or multiple taps) for instance.

In a particular example, once the first scrolling S16 is completed, the user may tap the content display field 22 at any place to scroll across the character string 32 and, depending on the location of the tap, initiate another insertion sequence in the same manner as explained above.

It should be understood that the above embodiments are only example implementations of the method and system of the present disclosure. Various variants are possible according to the present disclosure.

As explained earlier with reference to FIG. 7F, once it is detected (S22) that the handwriting recognition S12, S20 is completed, the insertion module M8 inserts (S14) the at least one recognised character(s) 50 at the insertion position P within the string 32 of characters 34 and the display module M1 scrolls (S16) the character string 32 in the direction D2 in the recognition area 28 so as to display, in the recognition area 28, at least part of the recognised characters 50 ("good" in this example) inserted into the character string 32.

In a variant, while handwriting recognition S12, S20 is being performed, the display module M1 inserts (S14), at the position P within the character string 32, the detected at least one input stroke 36. The display module M1 then scrolls the character string 32 in direction D2 in the recognition area 28 so as to display, while the handwriting recognition is in progress, at least part of the inserted at least one input stroke 36 in the recognition area 28. This advantageously allows the user to visualize in the recognition area 28 what he/she has just input while making additional space or room for further input in the insertion area 30. Once the handwriting recognition is completed S22, the display module M1 replaces the inserted input stroke(s) 36 being displayed in the recognition area 28 with the corresponding recognised character(s) 50.

Furthermore, as explained earlier, various embodiments are possible to perform the detection step S4 of user interaction causing the method to proceed to the selection step S6. In a particular embodiment, the selection module M2 is configured to determine in S4 whether a predefined user interaction is detected within the content display field 22. For instance, the method may proceed to the selection step S6 upon detection, by the insertion module M2, that a multi-point interaction (such as a double or triple tap) is performed within the content display field 22. The insertion module M2 may then select the insertion position P within the character string 32 based on the position of the detected multi-point interaction relative to the characters 34 displayed in the content display field.

The system and method of the present disclosure allow improved, efficient and user-friendly insertion of additional characters into an existing string of characters at an appropriate position therebefore, therein or thereafter. Accordingly, input of additional characters in a natural and relatively quick manner is provided.

In particular, when deciding whether (and where) characters should be inserted, a user may easily inspect the content of an existing character string as a large area of the touchscreen is used to display the string being inspected. A large input area of a screen may be used to display the character string while the user is looking for a position where one or more new characters are to be inserted within the character string.

Further, easy, efficient, and improved selection of the position at which insertion is to be carried out can be achieved thanks to the present teachings. By performing a simple and intuitive user interaction with the touchscreen, the user may initiate an insertion sequence to insert characters within an existing character string. Once the insertion position has been selected, the input area can be split into an insertion area and a recognition area to allow input of new characters in an easy and intuitive manner at the insertion position.

The described improved character insertion may be carried out without the need for complex or hard to remember gestures. The user may easily remember the procedure for performing character insertion according to the system and method of the present disclosure. The user may insert additional characters directly in the input area destined for handwriting input. In particular, the present system and method obviates the need for inserting additional characters using an input field separate from the input area of the digital device.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

Furthermore, aspects of the present principles can take the form of a computer readable storage medium. Any combination of one or more computer readable storage medium(s) may be utilized. A computer readable storage medium can take the form of a computer readable program product embodied in one or more computer readable medium(s) and having computer readable program code or instructions embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

What is claimed is:

1. A character input method performed by a computing device comprising:
    a processor; and
    a touchscreen display device that is operably connected to the processor, the touchscreen display device comprising an interactive user interface including:
        an input surface for inputting characters; and
        an output surface for displaying characters, the output surface comprising a recognition area and an insertion area that are adjacent to each other, the method comprising:
            firstly displaying, by the processor, a string of characters using the recognition area and the insertion area as a display region for the firstly displaying;
            in response to detecting, by the touchscreen display device, an interaction of a user with the input surface, selecting a position within the string of characters between a first character and a second character displayed on the output surface, the second character being consecutive to the first character within the string of characters;
            secondly displaying, by the processor, in the recognition area, a first part of the string of characters ending with the first character, while masking, in the insertion area, a second part of the string of characters starting with the second character;
            detecting, by the touchscreen display device, at least one input stroke entered manually in the insertion area;
            converting, by the processor and using handwriting recognition, the at least one input stroke into at least one recognised character;
            inserting, at the selected position within the string of characters, the at least one recognised character; and
            firstly scrolling, by the processor, the string of characters in the recognition area by moving the string of characters in a first direction to display, in the recognition area, at least part of the at least one recognised character that was inserted into the string of characters.

2. The method of claim 1, further comprising:
    detecting, by the touchscreen display device, as the detected interaction, an interaction performed by a user by contacting the input surface.

3. The method of claim 2, wherein the detecting comprises:
    comparing a pattern of the detected interaction with at least one predefined interaction pattern; and
    if the pattern of the detected interaction matches one of the at least one predetermined interaction pattern, performing the selecting and the secondly displaying in response to the detected interaction.

4. The method of claim 1, wherein the selected position is determined based on a position of the detected interaction on the input surface relative to the string of characters displayed in the firstly displaying.

5. The method of claim 1, wherein the detected interaction occurs in at least one of:
    the recognition area;
    the insertion area; and
    a content display field that displays, on the output surface, at least a portion of the string of characters that includes the first and second characters.

6. The method of claim 1, wherein the detected interaction is a predetermined gesture performed in contact with the input surface or a predetermined multi-tap interaction on the input surface.

7. The method of claim 6, wherein the detected interaction includes a substantially vertical gesture performed in contact with the input surface so as to intersect the string of characters as displayed in the display region during the firstly displaying.

8. The method of claim 1, wherein secondly displaying comprises:
    automatically scrolling, by the processor, in response to the detected interaction, the string of characters so as to move the first character to a side of the recognition area adjacent to the insertion area.

9. The method of claim 1, wherein secondly displaying comprises:
    if the first character is in the insertion area upon detection of the detected interaction, automatically scrolling the string of characters so as to move the first character from the insertion area into the recognition area.

10. The method of claim 1, wherein the string of characters comprises a plurality of words of at least one character each, the method comprising:
    during the firstly displaying, displaying each word of the plurality of words that is positioned in the recognition area, and displaying each word of the plurality of words that is positioned in the recognition area.

11. The method of claim 1, wherein the firstly scrolling comprises:
    scrolling the string of characters in the first direction from the insertion area to the recognition area so as to display, in the recognition area, the at least part of the at least one recognised character that was inserted into the string of characters.

12. The method of claim 1, wherein the firstly scrolling is performed automatically after the detecting of the at least one input stroke.

13. The method of claim 12 wherein the firstly scrolling is triggered automatically upon detection that the handwriting recognition is completed.

14. The method of claim 1, further comprising:
thirdly displaying, by the processor, in the insertion area, the detected at least one input stroke as digital ink while the handwriting recognition is being performed.

15. The method of claim 1, wherein the firstly scrolling comprises:
inserting, at the position within the string of characters, the at least one input stroke that was detected; and
scrolling the string of characters in the recognition area in the first direction so as to display, in the recognition area and while the handwriting recognition is being performed, at least part of the at least one input stroke that was inserted as digital ink.

16. The method of claim 15, wherein the first scrolling comprises:
replacing the inserted at least one input stroke that is being displayed in the recognition area as digital ink with the at least one recognised character when the handwriting recognition is completed.

17. The method of claim 1, wherein the firstly scrolling comprises:
displaying the at least one recognized character as typeset text in the recognition area.

18. The method according to claim 1, further comprising:
after the firstly scrolling, secondly scrolling, by the processor, to cause display of the string of characters to extend from the recognition area to the insertion area by moving the string of characters in a second direction opposite the first direction until entering into the insertion area.

19. A non-transitory computer readable medium having a computer readable program code embodied therein, the computer readable program code being adapted to be executed to implement a character input method in a computing device comprising:
a processor; and
a touchscreen display device that is operably connected to the processor, the touchscreen display device comprising an interactive user interface including:
an input surface for inputting characters; and
an output surface for displaying characters, the output surface comprising a recognition area and an insertion area that are adjacent to each other, the character input method comprising:
firstly displaying, by the processor, a string of characters using the recognition area and the insertion area as a display region for the firstly displaying;
in response to detecting, by the touchscreen display device, an interaction of a user with the input surface, selecting a position within the string of characters between a first character and a second character displayed on the output surface, the second character being consecutive to the first character within the string of characters;
secondly displaying, by the processor, in the recognition area, a first part of the string of characters ending with the first character, while masking, in the insertion area, a second part of the string of characters starting with the second character;
detecting, by the touchscreen display device, at least one input stroke entered manually in the insertion area;
converting, by the processor and using handwriting recognition, the at least one input stroke into at least one recognised character;
inserting, at the selected position within the string of characters, the at least one recognised character; and
firstly scrolling, by the processor, the string of characters in the recognition area by moving the string of characters in a first direction to display, in the recognition area, at least part of the at least one recognised character that was inserted into the string of characters.

20. A system for inputting characters, the system comprising:
a touchscreen display device comprising an interactive user interface including:
an input surface for inputting characters; and
an output surface for displaying characters, the output surface comprising a recognition area and an insertion area for accepting character input, the recognition area and the insertion area being adjacent to each other;
a non-transitory computer readable medium including instructions; and
a processor that is operably connected to the touchscreen display device and the non-transitory computer readable medium and that executes the instructions to perform operations comprising:
firstly displaying, by the processor, a string of characters using the recognition area and the insertion area of the output surface;
selecting, in response to detecting, by the touchscreen display device, an interaction of a user with the input surface, a position within the string of characters between a first character and a second character displayed on the output surface, the second character being consecutive to the first character within the string of characters;
secondly displaying, by the processor, in the recognition area, a first part of the string of characters ending with the first character, while masking, in the insertion area, a second part of the string of characters starting with the second character;
detecting, by the touchscreen display device, at least one input stroke entered manually in the insertion area;
converting, by the processor and using handwriting recognition, the at least one input stroke into at least one recognised character;
inserting, at the selected position within the string of characters, the at least one recognised character; and
firstly scrolling, by the processor, the string of characters in the recognition area by moving the string of characters in a first direction to display, in the recognition area, at least part of the at least one recognised character that was inserted into the string of characters.

* * * * *